United States Patent [19]
Fletcher et al.

[11] 3,743,357
[45] July 3, 1973

[54] RECIPROCATING WEDGE STRUCTURE INCLUDING LUBRICANT SUPPLY MEANS

[75] Inventors: Ralph A. Fletcher, Bedford, N.H.; Joseph R. Oliver, Lowell, Mass.

[73] Assignee: H. E. Fletcher, Co., Westford, Mass.

[22] Filed: Nov. 26, 1971

[21] Appl. No.: 202,500

[52] U.S. Cl............... 299/22, 175/227, 299/15
[51] Int. Cl. ................................ E21c 37/04
[58] Field of Search................. 299/15, 20–23; 175/227–229

[56] References Cited
UNITED STATES PATENTS
3,414,328  12/1968  Darda...................... 299/23 X

*Primary Examiner*—Ernest R. Purser
*Attorney*—Munroe H. Hamilton

[57] ABSTRACT

Lubrication for a fluid power actuated reciprocating wedge apparatus is carried out in a manner to protect wedging surfaces susceptible to rapid wear under exceedingly heavy load forces of as great as fifty tons or more. The wedge apparatus includes a spring-loaded wedge device, a wedge retaining structure, a driver mechanism for transmitting driving forces to the wedge device, and means for moving a lubricant of relatively heavy consistency through the wedge retaining structure. Excessive wear of wedge parts, normally taking place at a rapid rate under the heavy load forces noted in the wedging operation, is prevented by moving the lubricant into the spring-loaded wedge device as it expands and contracts so that the surfaces are always protected and a continuous exudation of small quantities of lubricant away from the wedge device is carried out to reduce wear and to exclude abrasive material from exposed slide surfaces of the wedge components.

3 Claims, 8 Drawing Figures

PATENTED JUL 3 1973

Inventors:
Ralph A. Fletcher,
Joseph R. Oliver,
by Munse & Hamilton
Attorney

Inventors:
Ralph A. Fletcher,
Joseph R. Oliver,
by Munroe H. Hamilton
Attorney

RECIPROCATING WEDGE STRUCTURE INCLUDING LUBRICANT SUPPLY MEANS

This invention relates in general to an improved method of wedge lubrication and in particular to a lubricant bearing wedge structure of the reciprocating plug and feather type as disclosed and claimed in U. S. Pat. No. 3,558,191 issued Jan. 26, 1971 and owned by the assignee of the present application.

In the class of reciprocating wedge described in U.S. Pat. No. 3,558,191, there is included a spring-loaded wedge device, a wedge retaining structure and a driver mechanism for transmitting driving forces to the wedge device. The wedge device itself is of the plug and feather type in which a pair of wedge feathers and a centrally disposed wedge plug are designed to be located in a drilled hole in stone. The wedge retaining structure and the driver mechanism are normally supported externally of the drilled hole in some suitable manner. The wedge retaining structure resiliently contains the wedge feathers in a normally contracted position against the wedge plug. A fluid pressure actuated piston arranged within the driver mechanism is connected to the wedge plug and operates to force the wedge plug into and out of a wedging position between the pair of resiliently contained wedge feathers with side thrust forces being exerted as great as fifty tons or more.

Difficulties are encountered when maintaining a reciprocating wedge of the fluid pressure operated type indicated in constant operation as may be required for example in utilizing the wedge device in drilled holes in a granite quarry. Excessive wear taking place at a relatively rapid rate under side thrust forces of fifty tons or more becomes concentrated along the inner surfaces of the wedge feathers tending to result in need for frequent replacement of these wedge feather components. This replacement operation is of a time-consuming and expensive nature. It will also be appreciated that wear problem becomes worse when abrasive particles, dust and other foreign materials, frequently present in drilled holes in stone, enter between the slide surfaces of the wedge feathers and the wedge plug.

It is a chief object of the invention, therefore, to cope with the problems of excessive wear in a fluid pressure operated reciprocating wedge device, and to devise an improved method and means for lubricating the reciprocating wedge structure. Another more specific object is to distribute and transfer lubricant in a continuous manner which utilizes especially the reciprocating movement of the wedge plug between the wedge feathers during each wedging operation as well as the resultant expansion and contraction of the wedge feathers so as to maintain thin films of lubricant between the slide surfaces at all times.

Another object of the invention is to devise a method and means for supplying heavy lubricant in a manner such that a continuous exudation of small quantities of lubricant is maintained through the open sides of the wedge device to create an outer protective mass for excluding abrasive material from accumulating between the wedging surfaces.

The nature of the invention and its other objects and novel features will be more fully understood and appreciated from the following description of a preferred embodiment of the invention selected for purposes of illustration and shown in the accompanying drawings, in which.

Figure 1:
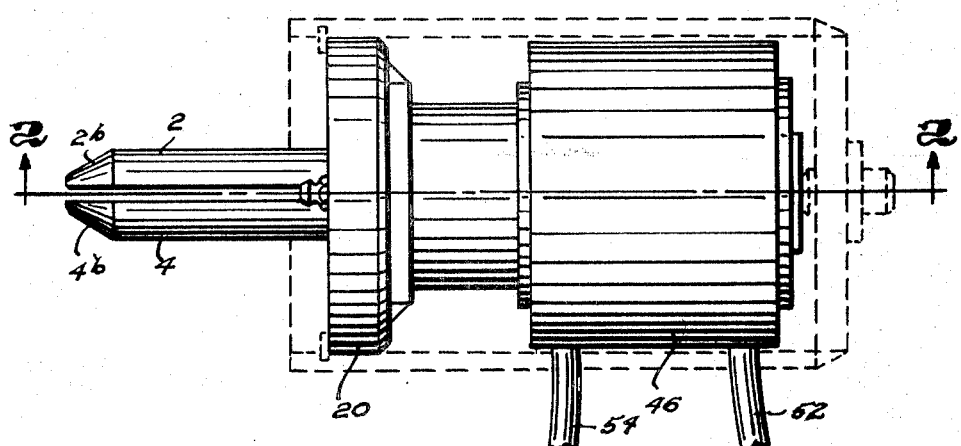
FIG. 1 is a side elevational view of the wedging apparatus of the invention.
Figure 2:
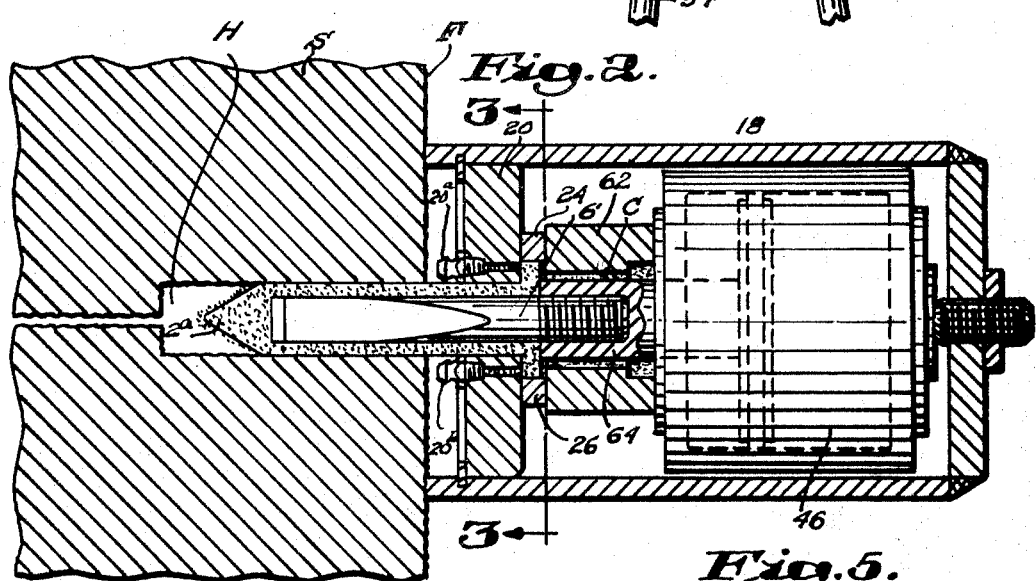
FIG. 2 is a cross section taken on the line 2—2 of FIG. 1.
Figure 7:
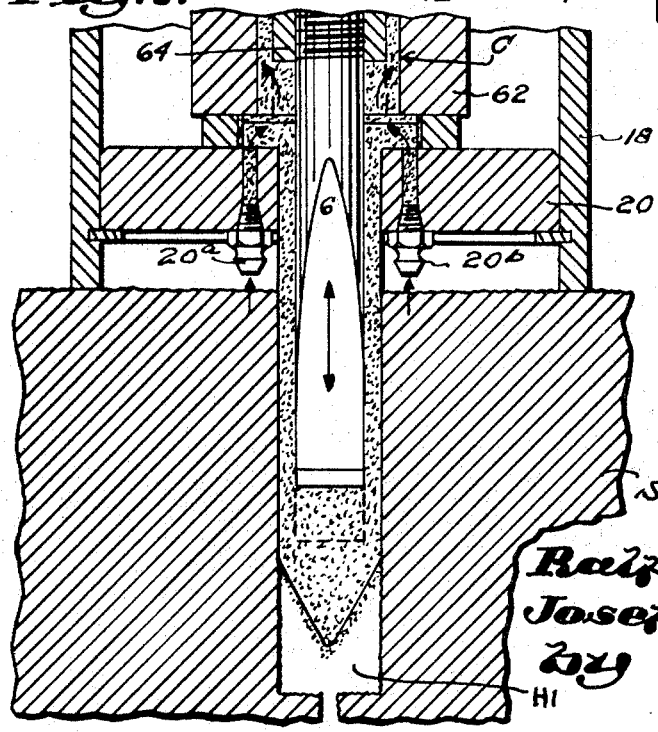
FIG. 7 is a cross section taken on the line 7—7 of FIG. 3.

FIG. 1 illustrates the wedging apparatus of the invention as it normally appears and FIG. 2 shows in section the same wedging device in a typical working position in stone. As shown in FIG. 2, reference character S denotes a mineral mass which may consist of a block or ledge of stone such as granite having a vertical face F. L denotes a separation or plane of splitting along which a cleavage is desired to be carried out by means of application of wedging forces. H indicates a horizontally drilled hole for receiving the wedge device of FIG. 1, and it will be understood that the hole H may be illustrative of a series of spaced apart holes for receiving a desired number of wedges as required. It will also be understood that vertical drilled holes may be provided as illustrated by the hole H1 in the stone S1 as shown in FIG. 7.

Considering the wedge apparatus of the invention in further detail, the parts shown generally include a self-lubricating reciprocating wedge device, a retaining structure for resiliently supporting the wedge device and a driver mechanism for exerting fluid power actuated forces on the wedge device when supported in the retaining structure.

Figure 4:
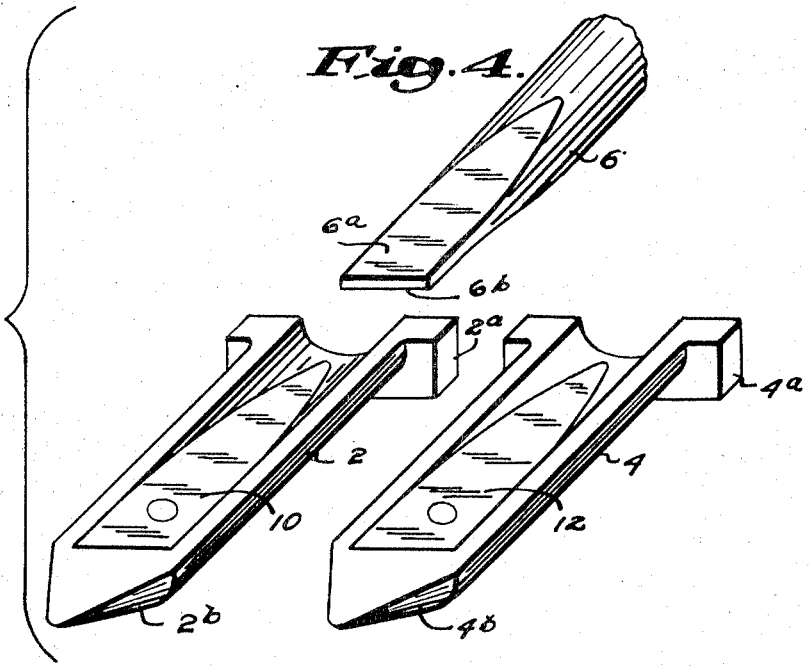
FIG. 4 is a composite perspective view of a wedge plug and a pair of wedge feathers shown in separated relationship.

Numerals 2 and 4 (FIG. 1) denote wedge feathers which are more clearly shown in FIG. 4 and which are designed to have centrally disposed therebetween a wedge plug 6. The wedge plug 6 comprises a cylindrical part which is formed at one end with a pair of beveled wedge faces 6a and 6b.

Figure 6:
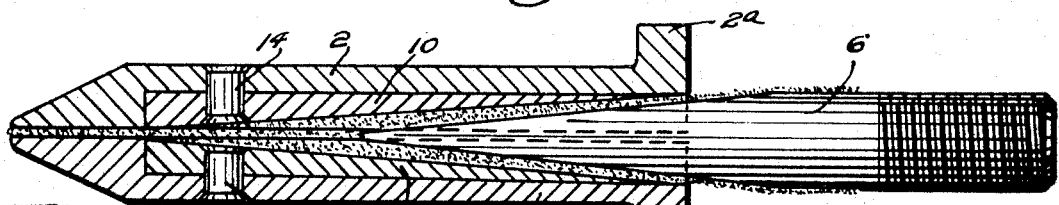
FIG. 6 is a cross sectional view of the wedge plug and wedge feathers illustrating lubricant contained therein.

As will be noted from an inspection of FIG. 4, the wedge feathers 2 and 4 comprise semicylindrical tubular sections which when placed against one another are adapted to define a cylindrical space in which the wedge plug 6 may be slidably received as shown in FIG. 6. At their upper ends, the wedge feathers 2 and 4 are formed with respective rectangularly shaped flanges 2a and 4a. Opposite ends of the wedge feathers are conically shaped at 2b and 4b and extending away from the conically shaped ends are internal tapered liner parts 10 and 12. The parts 10 and 12 have flat tapering surfaces which are complementary with the surfaces 6a and 6b of wedge plug 6 and these parts vary in thickness with the maximum thickness occurring at points adjacent to the conical ends 2b and 4b.

In the arrangement shown in FIGS. 4 and 6, the tapered parts 10 and 12 may be secured by rivets as 14 and 16, or if desired, the two cylindrical sections 2 and 4 may be formed with the tapered liner parts as integral portions of the sections. It will be apparent that the tapered surfaces of the wedge plug 6 when advanced between the wedge feathers will engage the tapered surfaces of the liner parts 10 and 12 and will force the cylindrical sections 2 and 4 apart to thus exert wedging forces in two opposite directions and substantially at right angles to the path of travel of the wedge plug.

The wedge assembly components comprised by the members 2, 4 and 6 are resiliently supported against one another in a special retaining structure which also houses a driver mechanism. This retaining structure includes a housing 18 at one end of which is detachably supported a cylinder 46 having a fluid power actuated driver piston 44 therein. At an opposite end of the housing 18 is supported a wedge retaining collar 20 which is mounted around the wedge plug and wedge feathers, as shown in FIGS. 1, 2, 5 and 7. Located between the collar and the driver mechanism is a cylindrical enclosure body 62 which is arranged in spaced relation around an internally threaded plunger portion 64 of piston 44. A threaded end of the wedge plug 6 is engaged with the plunger portion 64 as indicated in FIGS. 2 and 7.

The annular space occurring between the enclosure body 62 and internally threaded plunger portion 64 operates to contain small amounts of lubricant in constant contact with the plunger and the wedge plug.

Figure 8:
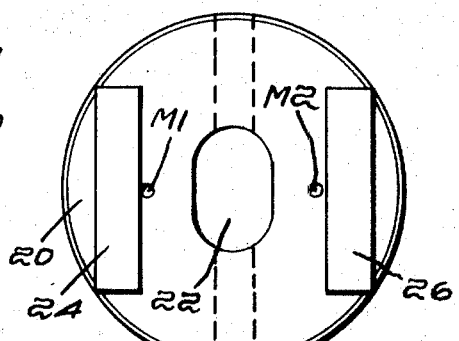
FIG. 8 is a detail plan view of a collar member.

As noted in FIG. 8, the collar 20 is constructed with an elongated opening 22 which is of size capable of receiving the wedge parts in a manner to permit the wedge feathers to move apart when the wedge plug is advanced between the feathers.

Figure 3:
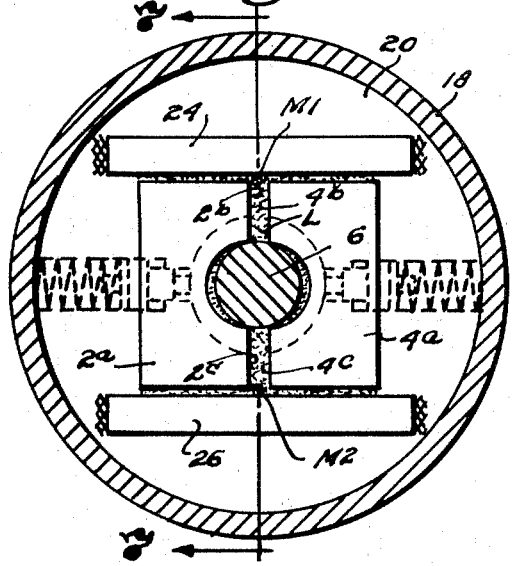
FIG. 3 is a cross section taken on the line 3—3 of FIG. 2.
Figure 5:
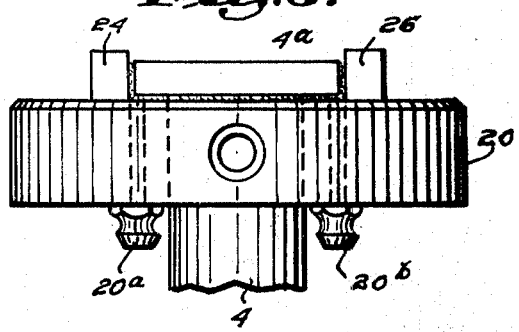
FIG. 5 is a fragmentary detail elevational view of a wedge retaining collar construction.

As shown in FIG. 3, flange portions 2a and 4a are also formed with centrally located recesses each of which have a curvature for engaging around and slidably supporting adjacent surfaces of the wedge plug 6 when the latter member is in a fully retracted position. The curved recesses are formed of a size such that inner edges 2b and 2c of flange 2a are at all times maintained in substantially separated relation with respect to edges 4b and 4c of flange 4a, thereby to define a lubricant chamber which communicates with the said annular space around the member 64 and which is operated to hold a further quantity of lubricant L (FIG. 3). At either side of the elongated opening 22 are solidly fixed a pair of elongated stops 24 and 26 as shown in FIGS. 3 and 8. These stops function to slidably engage the side edges of the flanges 2a and 4a so as to hold them against rotative movement.

Also provided in the collar 20 are opposite radially extending openings as 30 in which are loosely received a pair of spring-loaded pins 32 and 34 which are adapted to extend through the openings 30. The inner ends of the pins 32 and 34 engage against the wedge feathers 2 and 4 as suggested in FIG. 3 and are attached to coiled springs 36 and 38 one of which is more clearly shown in FIG. 8. The coiled springs are normally held in a compressed position by engagement with the inner peripheral surface of the cylindrical housing 18 as shown in FIGS. 2 and 3. The collar 20 is also releasably held in contact with the flange portions 2a and 4a by means of a resilient lock ring 40 which is forced into a groove formed around the inner periphery of the housing as illustrated in FIGS. 2 and 3.

In accordance with the invention, we provide in combination with the structure described lubricant inlet means M1 and M2 which are located through the collar 20 and are so arranged as to exit at points closely adjacent to the elongated stops 24 and 26, as shown in FIG. 8, and in addition, they occur in a position to connect with the lubricant chamber defined by the spaced apart edges of the flanges noted above.

At an opposite side of collar 20 are lubricant fittings 20a and 20b for receiving pressurized lubricant which may be conducted through the inlets M1 and M2, then into the lubricant chamber, and finally into the annular space around the plunger member.

In a typical wedging operation a relatively heavy lubricant is introduced into the fittings 20a and 20b under pressure and lubricant becomes forced into the annular space, filling this space all the way around the cylindrical enclosure body 64 and also completely filling the lubricant chamber between the flanges, and finally forcing lubricant into the spaces between the wedge plug and wedge feathers. Thereafter, the wedge device is placed in a drilled hole, as illustrated in FIGS. 2 and 7 with the wedge in a retracted position. The hydraulic cylinder is then actuated to advance the wedge plug 6 between the wedge feathers and exert opposite side thrust forces which operate to separate a portion of the mineral body.

When the wedging operation has been completed, the wedge plug is retracted with the wedge feathers being resiliently compressed against opposite sides of the wedge plug by means of the springs in the collar 20, as described above. It will be understood that this reciprocating movement of the wedge plug is carried out periodically and may occur throughout a relatively large number of splitting or wedging operations, particularly when the wedging device is used in company with a gang of such members as customarily happens in using these devices in a quarry machine.

The repeated travel of the wedge plug in and out between the wedge feathers, being at all times in contact with lubricant in both the annular space around the wedge plug and in the lubricant chamber between the flanges, results in an unique transfer of lubricant during each reciprocation of the wedge plug. Thus when the wedge plug is advanced, the head of the wedge plug picks up lubricant and carries it downwardly into the spaces between the wedge feathers. A similar movement of grease occurs from the lubricant chamber into the space between the wedge feathers. However, when the wedge plug is retracted, since the wedge feathers are resiliently contained against opposite sides of the wedge plug, some of the lubricant is extruded from the opposite spaces between the wedge feathers, while still other portions of the lubricant are compressed and displaced upwardly through the lubricant chamber. As this movement of lubricant takes place while the flanges are moving toward and away from one another, they and their surfaces are constantly protected with a thin film of lubricant as well as the slide surfaces of the wedge plug and the wedge feathers. The action of the wedge feathers in compressing lubricant contained between themselves and the wedge plug necessarily forces a small amount of the lubricant outwardly so that a protective mass is present all along the outer edges of the wedge feathers, and thus no grit, dust or other foreign material can enter to cause excessive wear.

It is also pointed out that by arranging the lubricant fittings in the particular manner shown and described by applicant, a periodic replacement of lubricant may be readily accomplished without removing the wedge device from the supporting structure in which it may be contained.

We claim:

1. A reciprocating wedge apparatus for use in a drilled hole, said wedge apparatus including a fluid pressure actuated driver mechanism having a plunger element, a wedge plug secured at one end of the plunger element, a cylindrical enclosure body located around the plunger in spaced relation thereto to define an annular space, a pair of wedge feathers slidably disposed at opposite sides of the wedge plug, said wedge feathers having transversely extending flange portions arranged in abutting relation against one end of the cylindrical enclosure body and being spaced apart to provide a lubricant chamber communicating with the annular space, a wedge retaining collar located around the wedge feathers, said collar being formed with an elliptically shaped opening in which the wedge feathers are resiliently contained and guided for transverse expansion and contraction when the plunger and wedge plug are reciprocated, said collar being formed with lubricant conducting fittings and connecting passageways which exit at the said lubricant chamber at points between the said flanged portions and in spaced relation to the said elliptically shaped opening at opposite sides thereof.

2. A self-lubricating reciprocating wedge device comprising in combination a fluid pressure operated driver mechanism, a plunger element supported for reciprocating movement at one end of the driver mechanism, a wedge plug secured to the plunger, a cylindrical enclosure body located around the plunger to define an annular space, a pair of transversely movable wedge feathers arranged to slidably receive the wedge plug therebetween, said wedge feathers having transversely extending flange portions arranged in abutting relation against an end of the enclosure body and being spaced apart to define a lubricant retaining chamber which communicates with the annular space, a wedge retaining collar located around the wedge plug and wedge feathers and being constructed with an elongated slot in which the wedge feathers are transversely displaceable when the wedge plug is advanced therebetween, a pair of parallel spaced apart stops fixed at one side of the collar for guiding transverse displacement of the flanges, spring loaded pin means projecting radially inwardly of the collar in a position to resiliently engage against each of the said wedge feathers and yieldably hold the wedge feathers against the wedge plug, said collar constructed with lubricant injecting inlet means which exit at an inner side of the collar at points between the said flanged portions to form passageways connecting with the lubricant retaining chamber, and lubricant fittings mounted at an outer side of the collar and connected to the said lubricant injecting inlet means for receiving and conducting pressurized lubricant into the lubricant chamber and the said annular space.

3. A self-lubricating reciprocating wedge device comprising in combination a fluid pressure operated driver mechanism, a plunger element supported for reciprocating movement at one end of the driver mechanism, a wedge plug secured to the plunger, a cylindrical enclosure body located around the plunger in spaced relation to define an annular space, a pair of transversely movable wedge feathers arranged to slidably receive the wedge plug therebetween, said wedge feathers being formed with flanged portions slidably abutting against an end of the enclosure body and being spaced apart to form a lubricant retaining chamber, a wedge retaining collar located around the wedge plug and wedge feathers and being constructed with an elongated slot in which the wedge feathers are transversely displaceable when the wedge plug is advanced therebetween, a pair of parallel spaced apart stops fixed at one side of the collar for guiding transverse displacement of the flanges, spring loaded pin means projecting radially inwardly of the collar in a position to resiliently engage against each of the said wedge feathers and yieldably hold the wedge feathers against the wedge plug, said collar constructed with lubricant of relatively heavy consistency contained in the annular space in contact injecting inlet means which exit at an inner side of the collar at points between the said flanged portions, a body of lubricant of relatively heavy consistency contained in the annular space in contact with the said plunger and connected wedge plug portion, said body of lubricant extending into the lubricant chamber between the wedge feather flanges in a position to be periodically compressed and extruded from between the wedge feathers as they are moved toward and away from one another when the wedge plug is being reciprocated.

* * * * *